United States Patent
Zhang et al.

(10) Patent No.: US 12,339,841 B2
(45) Date of Patent: Jun. 24, 2025

(54) DATABASE MANAGEMENT SYSTEM AND METHOD FOR GRAPH VIEW SELECTION FOR A RELATIONAL-GRAPH DATABASE

(71) Applicant: HUAWEI TECHNOLOGIES CO., LTD., Guangdong (CN)

(72) Inventors: Chao Zhang, Helsinki (FI); Jiaheng Lu, Helsinki (FI); Xiaochun Han, Shanghai (CN); Xinyong Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 215 days.

(21) Appl. No.: 18/063,343

(22) Filed: Dec. 8, 2022

(65) Prior Publication Data

US 2023/0126509 A1  Apr. 27, 2023

Related U.S. Application Data

(63) Continuation of application No. PCT/CN2020/095161, filed on Jun. 9, 2020.

(51) Int. Cl.
*G06F 16/2453* (2019.01)
*G06F 16/901* (2019.01)

(52) U.S. Cl.
CPC ...... *G06F 16/2453* (2019.01); *G06F 16/9024* (2019.01)

(58) Field of Classification Search
CPC .................. G06F 16/2453; G06F 16/9024
See application file for complete search history.

(56) References Cited

U.S. PATENT DOCUMENTS

| 10,387,497 B2 | 8/2019 | Fokoue-Nkoutche et al. |
| 11,120,082 B2 * | 9/2021 | Hilloulin ............... G06F 16/288 |

(Continued)

FOREIGN PATENT DOCUMENTS

| CN | 102156725 A | 8/2011 |
| CN | 113934899 A * | 1/2022 |

(Continued)

OTHER PUBLICATIONS

Da Trindade Joana M. F. et al: "Kaskade: Graph Views for Efficient Graph Analytics", 2020 IEEE 36th International Conference on Data Engineering (ICDE), Apr. 1, 2020(Apr. 1, 2020), pp. 193-204, XP93041000.

(Continued)

*Primary Examiner* — Boris Gorney
*Assistant Examiner* — Robert F May

(57) ABSTRACT

A database management system for performing a graph query based on one or more graph views of a relational-graph database is disclosed. The database management system is configured to determine a plurality of graph views from the relational-graph database based on one or more previous graph queries of the relational-graph database to obtain a plurality of candidate graph views of the relational-graph database. Moreover, the database management system is configured to store a subset of the plurality of candidate graph views of the relational-graph database and perform a graph query of the relational-graph database based on the subset of the plurality of candidate graph views of the relational-graph database. By virtue of the selected subset of the plurality of candidate graph views from the relational-graph database, the database management system can increase the processing speed of graph queries.

15 Claims, 7 Drawing Sheets

(56) References Cited

U.S. PATENT DOCUMENTS

| | | | |
|---|---|---|---|
| 2010/0241644 A1 | 9/2010 | Jackson et al. | |
| 2015/0081724 A1* | 3/2015 | Xu | G06F 16/9024 |
| | | | 707/749 |
| 2015/0081741 A1 | 3/2015 | Xu | |
| 2016/0342709 A1 | 11/2016 | Fokoue-Nkoutche et al. | |
| 2017/0293697 A1* | 10/2017 | Youshi | G06F 16/84 |
| 2018/0096035 A1* | 4/2018 | Kreutzer | G06F 16/24549 |
| 2019/0196890 A1* | 6/2019 | Bucchi | G06F 16/951 |
| 2019/0325292 A1* | 10/2019 | Remis | G06F 16/9024 |
| 2019/0332698 A1* | 10/2019 | Cho | G06F 16/2393 |
| 2020/0265049 A1* | 8/2020 | da Trindade | G06F 16/24545 |

FOREIGN PATENT DOCUMENTS

| | | |
|---|---|---|
| EP | 1193618 B1 | 12/2017 |
| KR | 101725502 B1 * | 4/2017 |

OTHER PUBLICATIONS

Sun, Wen, et al. "Sqlgraph: An efficient relational-based property graph store." Proceedings of the 2015 ACM SIGMOD International Conference on Management of Data. May 27, 2015. total 15 pages.

Y. Perez, R. Sosi c, A. Banerjee, R. Puttagunta, M. Raison, P. Shah, and J. Leskovec. Ringo: Interactive graph analytics on big-memory machines. In Proceedings of the 2015 ACM SIGMOD International Conference on Management of Data, pp. 1105-1110. ACM, Mar. 26, 2015.

K. Xirogiannopoulos, U. Khurana, and A. Deshpande. Graphgen: Exploring interesting graphs in relational data. Proceedings of the VLDB Endowment, 8(12):2032-2035, Aug. 1, 2015. total 4 pages.

M. S. Hassan, T. Kuznetsova, H. C. Jeong, W. G. Aref, and M. Sadoghi. Extending in-memory relational database engines with native graph support. Apr. 2018. total 36 pages.

S. Agrawal, S. Chaudhuri, and V. R. Narasayya. Automated selection of materialized views and indexes in sql databases. In VLDB, vol. Jan. 2000, pp. 496-505, 2000.

A. Katsifodimos, I. Manolescu, and V. Vassalos. Materialized view selection for xquery workloads. In Proceedings of the May 20, 2012 ACM SIGMOD International Conference on Management of Data, pp. 565-576. ACM, 2012.

Goasdou, Francois, et al. "View selection in semantic web databases." In VLDB (Oct. 1, 2011), total 12 pages.

L. P. Cordella, P. Foggia, C. Sansone, and M. Vento. A (sub) graph isomorphism algorithm for matching large graphs. IEEE transactions on pattern analysis and machine intelligence, 26(10):1367-1372, Aug. 16, 2004. total 6 pages.

M. A. Rodriguez. The gremlin graph traversal machine and language (invited talk). In Proceedings of the 15th Symposium on Database Programming Languages, pp. 1-10. ACM, Oct. 2015.

Francis, Nadime, et al. "Cypher: An evolving query language for property graphs." Proceedings of the 2018 International Conference on Management of Data. May 27, 2018. total 15 pages.

S. Agrawal, S. Chaudhuri, and V. R. Narasayya. Automated selection of materialized views and indexes in sql databases. In VLDB, vol. 2000, pp. 496-505, Jan. 2000.

L. W. F. Chaves, E. Buchmann, F. Hueske, and K. Bohm. Towards materialized view selection for distributed databases. In Proceedings of the 12th international conference on extending database technology: advances in database technology, pp. 1088-1099. ACM, Mar. 2009.

R. Chirkova and C. Li. Materializing views with minimal size to answer queries. In Proceedings of the twenty-second ACM SIGMOD-SIGACT-SIGART symposium on Principles of database systems, pp. 38-48. ACM, Jun. 9, 2003.

W. Fan, X. Wang, and Y. Wu. Answering graph pattern queries using views. In 2014 IEEE 30th International Conference on Data Engineering, pp. 184-195. IEEE, Mar. 2014.

H. Gupta. Selection of views to materialize in a data warehouse. In International Conference on Database Theory, pp. 98-112. Springer, 1997. vol. 17, No. 1, Jan. 2005.

A. Y. Halevy. Answering queries using views: A survey. The VLDB Journal, 10(4):270-294, 2001. Digital Object Identifier (DOI)10. 1007/s007780100054, /Accepted: Mar. 23, 2001.

V. Harinarayan, A. Rajaraman, and J. D. Ullman. Implementing data cubes efficiently. In ACM SIGMOD Record, vol. 25, pp. 205-216. ACM, Jun. 1, 1996.

W. Le, S. Duan, A. Kementsietsidis, F. Li, and M. Wang. Rewriting queries on sparql views. In Proceedings of the 20th international conference on World wide web, pp. 655-664. ACM, Mar. 2011. Mar. 28-Apr. 1, 2011, Hyderabad, India.

B. Mandhani and D. Suciu. Query caching and view selection for xml databases. In Proceedings of the 31st international conference on Very large data bases, pp. 469-480. VLDB Endowment, Aug. 2005.

N. Tang, J. X. Yu, H. Tang, M. T. Ozsu, and P. Boncz. Materialized view selection in xml databases. In International Conference on Database Systems for Advanced Applications, pp. 616-630, Springer, Mar. 2009.

D. C. Zilio, J. Rao, S. Lightstone, G. Lohman, A. Storm, C. Garcia-Arellano, and S. Fadden. Db2 design advisor: integrated automatic physical database design. In Proceedings of the Thirtieth international conference on Very large data bases—vol. 30, pp. 1087-1097, VLDB Endowment, Aug. 2004.

R. Chirkova, J. Yang, et al. Materialized views. Foundations and Trends R in Databases, 4(4):295-405, Dec. 14, 2012, vol. 4, No. 4 (2011), DOI: 10.1561/1900000020.

TinkerPop. A graph computing framework for both graph databases (OLTP) and graph analytic systems (OLAP). (2020), Copyright 2015-2023 The Apache Software Foundation, total 5 pages.

SQLG. An implementation of Apache TinkerPop on a RDBMS. (2020), Pieter Martin, Version 3.1.0, Apr. 2024 (Apr. 28, 2024), total 119 pages.

X. L. Informatik. Materialized view selection: A survey. 2010. Informatik 5, RWTH Aachen University, total 12 pages.

International Search Report issued in PCT/CN2020/095161, dated Mar. 9, 2021, 10 pages.

Extended European Search Report issued in EP20939937.7, dated Mar. 5, 2023, 6 pages.

* cited by examiner

Algorithm 1: View-based verification algorithm(VVA)

Input: A pattern query $Q_g$, a view $V(Q'_g)$ that has a subgraph isomorphism mapping $M$ from $Q_g$.
Output: A Boolean value deciding whether or not query $Q_g$ can be answered by $V_G(Q'_g)$.

1  $D_v \leftarrow \emptyset$, $l \leftarrow E'_p.length$ ;        // Initialization
2  for $i \leftarrow 1$ *to* $l$ do
           // Termination condition
3        if $D_v = M(V_p)$ then
4              return $True$
           // Verify the condition 1
5        if $E'_p[i] = (u'_i, v'_i) \in M(E_p)$ then
6              $D_v.put(\{u'_i, v'_i\})$
           // Verify the condition 2
7        else if *there is* $v' \in M(V_p)$ *but* $E'_p[i] \notin M(E_p)$ then
8              if $v' \notin D_v$ then
9                    return $False$
10 return $True$

FIG. 4

Algorithm 2: Benefit-Driven Algorithm (BDA) for the view-selection problem

Input: A query workload $Q$, a candidate view set $V$, a space budge $S$.
Output: A subset $V_s$ of $V$.

1  $B_V, S_V, DP[B_V][S_V] \leftarrow \emptyset$ ;        // Initialize the table of view size and benefit
2  foreach $v \in V$ do        // Evaluate the view benefit in the candidate set
3        $s_v = v.size$
4        foreach $q \in Q$ do        // Enumerate the queries in the workload
5              $b_v = b_v + b(v, q)$
6        end
7        $B_V.put(b_v), S_V.put(s_v)$        // Put the view benefit and size in the vector
8        for $i \leftarrow 1$ *to* $B_V.length$ do
9              for $j \leftarrow 1$ *to* $S$ do
10                   if $B_V[i] < j$ then
11                         $DP[B_V][S_V] = max(B_v[i] + DP[i-1][S - S_V[i]], DP[i-1][S])$
12                   else
13                         $DP[B_V][S_V] = DP[i-1][S]$
14                   end
15             end
16       end
17       $i \leftarrow B_V.length, j \leftarrow S$
18       while $j > 0$ *and* $i \neq 0$ do
19             if $DP[i-1][j] \neq DP[i][j]$ then
20                   $V_s.add(V[i])$
21                   $j = j - S_v[i-1]$
22                   $i = i - 1$
23       end
24 end
25 return $V_s$

FIG. 5

Algorithm 3: Graph-Genetic Algorithm (GGA) for the view-selection problem

Input: A query workload $Q$, a candidate view set $V$, a space budge $S$, fission probability $p_f$, fusion probability $p_c$.
Output: A transformed view set $V_s$.

1 while !*timeout* do
2     for $i \leftarrow 1$ *to* $V.length$ do
3        if $random(0,1) < p_f$ then
4           $V = V_{index \neq i} \cup fission(V_i)$      // Fission transformation
5        if $random(0,1) < p_c$ then
6           $V = fusion(V_{index \neq i}, V_i)$      // Fusion transformation
7     end
8     $V' = Greedy(V, Q, S)$ ;      // A greedy selection
9     if $B'_V > B_V$ then
10        $V_s = V'$
11     else
12        skip $V'$
13     end
14 end
15 return $V_s$

FIG. 6

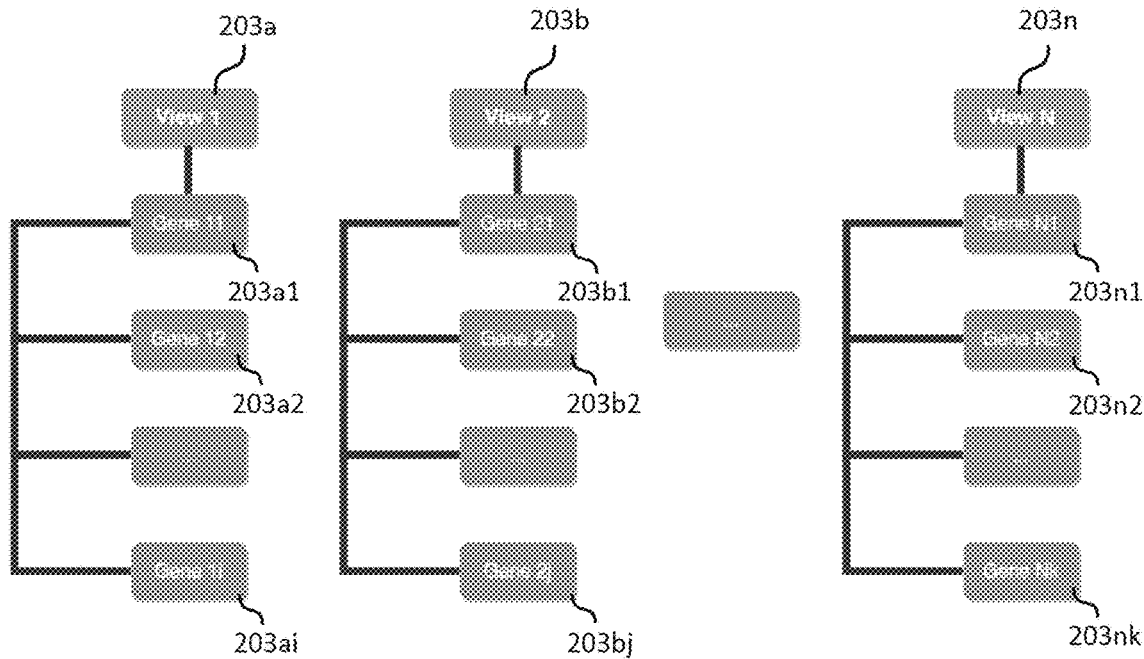

FIG. 7

DATABASE MANAGEMENT SYSTEM AND METHOD FOR GRAPH VIEW SELECTION FOR A RELATIONAL-GRAPH DATABASE

CROSS-REFERENCE TO RELATED APPLICATIONS

This application is a continuation of International Application No. PCT/CN2020/095161, filed on Jun. 9, 2020, the disclosure of which is hereby incorporated by reference in its entirety.

TECHNICAL FIELD

The present disclosure relates to database systems. More specifically, the present disclosure relates to a database management system and method for performing one or more graph queries.

BACKGROUND

Graph data is becoming increasingly ubiquitous across many application domains, such as social networks, biology and medicine, and real-time routing and tracking. This trend propels the proliferation of graph databases as they typically excel in these scenarios. Two crucial elements that make graph databases successful are the property graph model (PGM) and accompanying graph query languages, for instance, the Gremlin query language. The property graph model represents graph data in a natural way such that vertices and edges in a graph are associated with a set of properties, wherein each property is a key-value pair. Graph query languages, such as Gremlin, enable users to succinctly query their application's property graph with a wealth of functional and distinctive features that include declarative pattern matching, graph traversal, and reachability query in practice. As the property graph model and graph query languages are rapidly gaining popularity for graph data management, relational databases have enabled both graph technologies over a relational store. These kinds of systems may be referred to as relational-graph databases, which implement the property graph model over a relational store, translate the graph queries to relational queries, such as SQL queries, and finally execute the relational query, e.g., SQL query in a relational query engine. FIG. 1 illustrates an exemplary relational-graph database 100 configured to handle graph queries 101 on the basis of property graphs, i.e., the property graph model 103, over a relational database management system (RDBMS) 105.

Unfortunately, conventional relational-graph databases have several limitations in handling, i.e., answering graph queries. Firstly, these approaches are limited to specific graph queries that can be translated into SQL or blended with SQL, and, thus, cannot support full-fledged graph query features. Secondly, these approaches have performance overheads due to computing the graphs from the relational store during runtime and, thus, are inefficient for performing complex graph queries. Lastly, these approaches do not take into account the resource budget for accommodating the graph data, which is crucial for end users and generally cannot be compromised.

SUMMARY

It is an objective of the present disclosure to provide an improved database management system and method allowing to improve the performance of graph queries in a relational-graph database.

The foregoing and other objectives are achieved by the subject matter of the independent claims. Further implementation forms are apparent from the dependent claims, the description and the figures.

According to a first aspect, a database management system for performing one or more graph queries based on one or more graph views of a relational-graph database is provided. The database management system comprises a memory and a processor. The processor is configured to determine a plurality of graph views of the relational-graph database based on one or more previously processed graph queries of the relational-graph database for obtaining a plurality of candidate graph views of the relational-graph database. Moreover, the processor of the database management system is configured to store a selected subset of the plurality of candidate graph views of the relational-graph database in the memory and to perform one or more graph queries of the relational-graph database based on the subset of the plurality of candidate graph views of the relational-graph database. Advantageously, the database management system according to the first aspect allows selecting and maintaining a subset of "optimized" candidate graph views of the relational-graph database within the memory constraints of the database management system, thereby improving the performance of graph queries. The database management system may be configured to perform the one or more graph queries in a sequential or substantially parallel order.

As used herein, a relational-graph database implements a property graph model over a relational database and is configured to translate a graph query to a SQL query and execute the SQL query in a relational query engine. Thus, a relational-graph database is a database that supports both graph and relational models. The graph query may be a Gremlin graph query.

In a further possible implementation form, each candidate graph view may occupy a respective portion possibly of different size of the memory of the database management system. The processor of the database management system may be further configured to determine the subset of the plurality of candidate graph views of the relational-graph database based on a total size of the memory available for storing the selected subset of the plurality of candidate graph views of the relational-graph database and/or one or more performance indicators associated with the plurality of candidate graph views. As will be described in more detail further below, the one or more performance indicators (or performance measure values) may be one or more local performance indicators associated with a respective candidate graph view and/or one or more global performance indicators associated with a set of candidate graph views.

In a further possible implementation form, the database management system may further comprise a graph query engine and a relational query engine, wherein the database management system is further configured to determine a respective local performance indicator for each of the plurality of candidate graph views by comparing one or more queries processed by the graph query engine using the respective candidate graph view with the same one or more queries processed by the relational query engine without using the respective candidate graph view.

In a further possible implementation form, the database management system is further configured to translate the one or more graph queries for the graph query engine into one or more relational queries for the relational query engine, when the one or more graph queries are not processable, i.e., cannot be answered by the graph query engine.

In a further possible implementation form, the database management system is further configured to determine the subset of the plurality of candidate graph views of the relational-graph database based on the plurality of local performance indicators of the plurality of candidate graph views and the total size of the memory available for storing the selected subset of the plurality of candidate graph views of the relational-graph database.

In a further possible implementation form, the database management system is further configured to determine whether the one or more graph queries are processable by the graph query engine using the respective candidate graph view.

In a further possible implementation form, the one or more performance indicators associated with the plurality of candidate graph views comprise a plurality of global performance indicators, wherein each global performance indicator is associated with a respective different combination of the plurality of candidate graph views. The database management system is further configured to determine the subset of the plurality of candidate graph views of the relational-graph database based on the plurality of global performance indicators. In other words, the database management system may be configured to determine the subset of the plurality of candidate graph views of the relational-graph database by selecting the combination of candidate graph views providing the most benefit, i.e., the largest global performance indicator within the constraints for storing the selected candidate graph views within the memory. A respective combination of candidate graph views and its global performance indicator, i.e., total benefit, can be considered to define a state and the process of determining the subset of the plurality of candidate graph views of the relational-graph database as a state search. The initial state may correspond to the input candidate view set, i.e., the plurality of candidate graph views having a certain benefit, i.e., global performance indicator. By adding, modifying, and removing views from this initial state, another state, i.e., combination of candidate graph views, may be obtained from the initial state, which may have a higher benefit, i.e., global performance indicator than the initial state, and so on.

In a further possible implementation form, the database management system is further configured to determine the global performance indicator for a respective combination of the plurality of candidate graph views by splitting a respective candidate graph view into at least two candidate sub-graph views. The process of splitting a respective candidate graph view into at least two candidate sub-graph views is herein referred to as a fission operation.

In a further possible implementation form, the database management system is further configured to determine the global performance indicator for a respective combination of the plurality of candidate graph views, i.e., a respective state, by generating a new candidate graph view by merging sub-graphs of at least two of the plurality of candidate graph views. The process of merging sub-graphs of at least two of the plurality of candidate graph views is herein referred to as a fusion operation. The main goal of the fission and the fusion operation is to identify and merge common sub-graph components of at least two graph views of the plurality of candidate graph views.

In a further possible implementation form, each candidate graph view comprises a candidate graph view pattern and a candidate graph view content, wherein the database management system is further configured to determine the plurality of candidate graph views based on the one or more previous graph queries by mapping the one or more previous graph queries to one or more candidate graph view patterns.

In a further possible implementation form, the database management system is further configured to map, i.e., translate the one or more previous graph queries to the one or more candidate graph view patterns by sequentially mapping nodes and edges of the one or more previous graph queries to nodes and edges of the one or more candidate graph view patterns. The database management system may further implement a filtering-and-verification framework configured to check whether a given graph query can be answered by such a constructed candidate graph view.

In a further possible implementation form, the database management system is further configured to generate, based on the one or more previous graph queries, a respective edge-induced graph for generating the respective candidate graph view content of the respective candidate graph view. In an implementation form, the database management system is further configured to traverse the edges from the starting edge in a sequential order as the query's pattern, and add, for each visited pattern edge, all the matched results of edges in the data graph with their end points to the view graph, until all the patterns have been visited. Since the matched results of an edge depend on its previous traversals, the database management system may clone previous traversals and cache the visited end points as the intermediate results and use them to compute the matches of subsequent traversals.

In a further possible implementation form, the database management system is further configured to determine a cost measure value for each of the candidate graph views and to limit the number of candidate graph views by removing the candidate graph views having a cost measure value larger than a cost measure threshold value. Thus, the database management system may be configured to prune the candidate graph based on their respective cost measure values.

In a further possible implementation form, the database management system is further configured to receive one or more further graph queries and to dynamically adjust the subset of the plurality of candidate graph views of the relational-graph database stored in the memory based on the one or more further graph queries of the relational-graph database. When a new query is contained by the previous candidate graph views, the database management system may update the benefit of the corresponding views. When a new query is not contained by the previous candidate graph views, the database management system may store a newly selected subset of the updated candidate graph views of the relational-graph database in the memory. In other words, the newly selected candidate graph views that are not in the previously selected views may be cached and the outdated views may be evicted if the memory space is not sufficient.

According to a second aspect, a method for performing a graph query based on one or more graph views of a relational-graph database is provided. The method comprises a step of determining a plurality of graph views of the relational-graph database based on one or more previously processed graph queries of the relational-graph database to obtain a plurality of candidate graph views of the relational-graph database. Moreover, the method comprises a step of storing a selected subset of the plurality of candidate graph views of the relational-graph database. Furthermore, the method comprises a step of performing a graph query of the relational-graph database based on the subset of the plurality of candidate graph views of the relational-graph database. Advantageously, the method according to the second aspect allows selecting and maintaining a subset of "optimized"

graph views of the relational-graph database, thereby improving the performance of graph queries.

The method according to the second aspect of the present disclosure can be performed by the system according to the first aspect of the present disclosure. Thus, further features of the method according to the second aspect of the present disclosure result directly from the functionality of the system according to the first aspect of the present disclosure and its different implementation forms and embodiments described above and below.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 4 illustrates a first algorithm implemented by a database management system according to an embodiment;

FIG. 5 illustrates a second algorithm implemented by a database management system according to an embodiment;

FIG. 6 illustrates a third algorithm implemented by a database management system according to an embodiment;

FIG. 7 illustrates an indexing scheme implemented by a database management system for maintaining a plurality of candidate graph views according to an embodiment;

In the following, identical reference signs refer to identical or at least functionally equivalent features.

DETAILED DESCRIPTION OF EMBODIMENTS

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g., one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g., one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1:
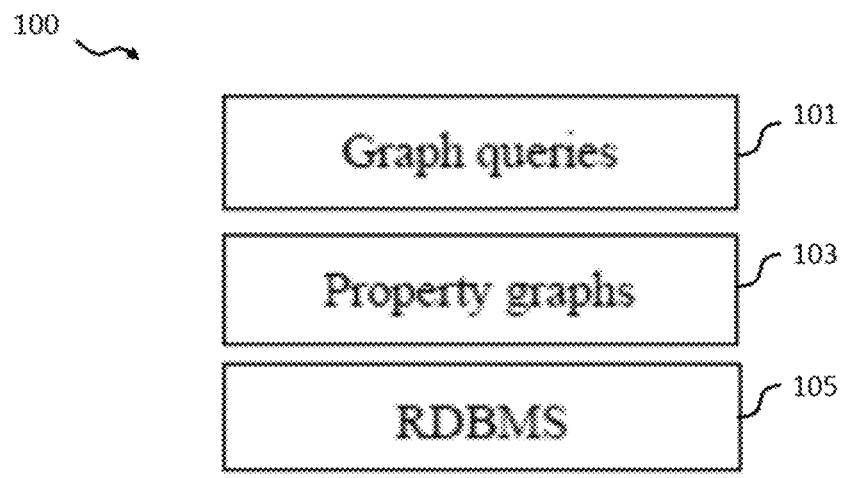
FIG. 1 is a schematic diagram illustrating the general architecture of a relational-graph database.
Figure 2A:
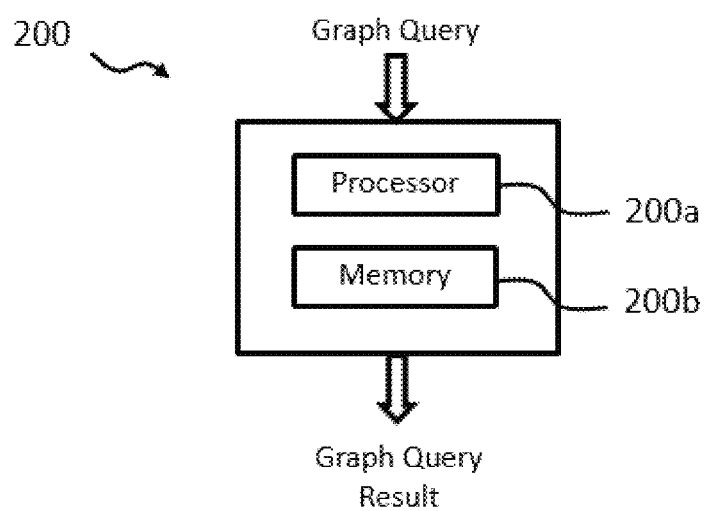
FIG. 2a is a schematic diagram illustrating a database management system according to an embodiment configured to perform a graph query.

FIG. 2a is a schematic diagram illustrating a database management system 200 according to an embodiment. The database management system 200 comprises processor 200a and a memory 200b. The processor 200a is configured to perform one or more graph queries, such as a Gremlin query, based on one or more graph views of a relational-graph database. As used herein, a relational-graph database implements a property graph model (PGM) over a relational database and is configured to translate a graph query to a SQL query and execute the SQL query in a relational query engine. Thus, a relational-graph database is a database that supports both graph and relational models.

Gremlin is a query language with a widespread support across graph databases and may be considered as the equivalent of SQL for graph database systems. Gremlin is a graph traversal language for traversing property graphs, which allows to express queries as one or more graph traversals. In particular, a declarative traversal is expressed by a set of traversal patterns and can be mapped to subgraph queries. Gremlin's pattern matching is a general traversal that can also be mapped from other traversals such as linear, nested and path traversals.

Figure 2B:
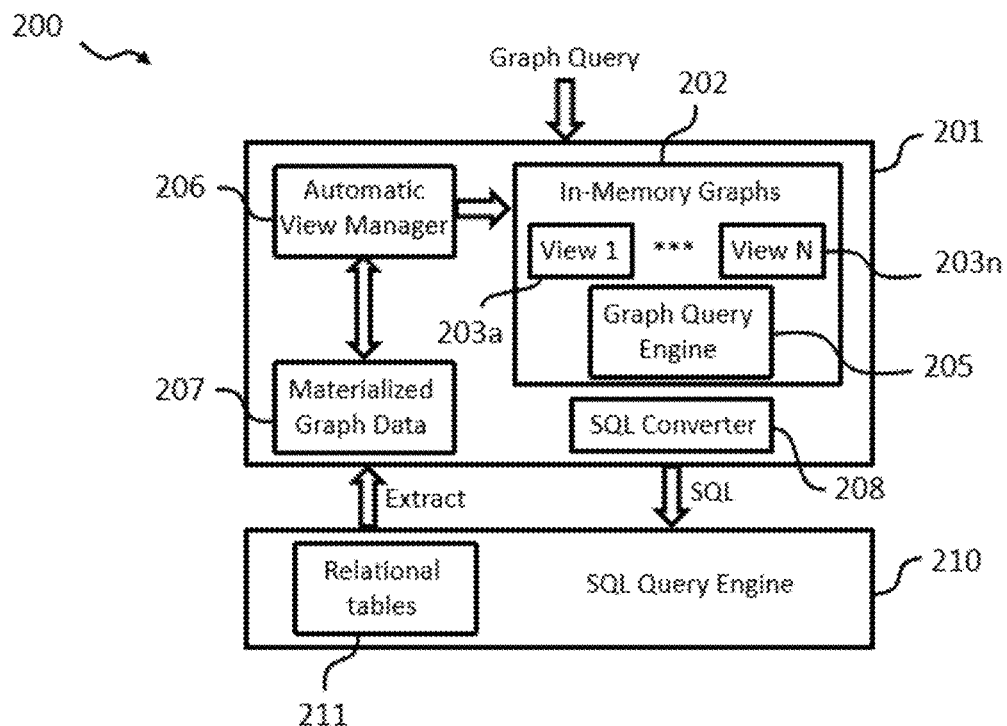
FIG. 2b is a schematic diagram illustrating structural and functional components of a database management system configured to perform a graph query according to an embodiment.

FIG. 2b is a schematic diagram illustrating structural and functional components, i.e., the overall architecture of the database management system 200 configured to perform a graph query according to an embodiment. As will be described in more detail below in the context of FIGS. 2a and 2b, the processor 200a of the database management system 200 is configured to determine a plurality of graph views of a relational-graph database based on one or more previously processed graph queries of the relational-graph database to obtain a plurality of candidate graph views 203a-n of the relational-graph database. Moreover, the processor 200a of the database management system 200 is configured to store a selected subset of the plurality of candidate graph views 203a-n of the relational-graph database in the memory 200b and to perform a graph query of the relational-graph database based on the subset of the plurality of candidate graph views 203a-n of the relational-graph database. As will be described in more detail below, in the embodiment shown in FIG. 2b, the relational-graph database comprises a SQL converter 208, a SQL query engine 210 as well as a relational database, i.e., relational tables 211. Advantageously, the database management system 200 allows selecting and maintaining a subset of "optimized" candidate graph views of the relational-graph database within the memory constraints of the database management system 200, thereby improving the performance of graph queries.

Thus, the database management system 200 makes advantageous use of materialized graph views that can be cached in advance to speed up the graph queries in a relational-graph database, such as the relational-graph database illustrated in FIG. 2b. Materialized views (or short "views") are queries whose results are stored and maintained in order to facilitate access to data in their underlying base tables. Materialized views are a natural embodiment of the ideas of pre-computation and caching in databases. Instead of computing a query from base data, a database system can use results that have already been computed, stored, and maintained.

Before a more detailed description of different embodiments of the database management system 200 is provided, some aspects of the database management system 200 according to an embodiment will be summarized in the following. An automatic graph view selection advisor implemented by the database management system 200 according to an embodiment produces a fast and reasonable recommendation of views which are beneficial for a specified graph workload in a relational-graph database. Candidate graph views may be constructed from the query history through a query-to-pattern mapping mechanism. The benefits of views may be calculated by evaluating the query in the relational engine and an in-memory graph query engine 205. The database management system 200 according to an embodiment may implement one of two methods for selecting the graph views based on the view benefit value defined by one or more local performance indicators or a global performance indicator. An incremental view maintenance may be implemented by the database management system 200 according to an embodiment for handling incoming new data and workloads.

Candidate views are obtained from the query history, wherein each view may be associated with a weight based on the query frequency. Uninteresting views may be pruned or eliminated based on the threshold of the query cost and the size of the involved table set. The remaining subsets that satisfy the user-defined resource budget may be considered as candidate views to determine which are the best view selection, i.e., a subset of candidate graph views.

In an embodiment of the database management system 200, a query-to-pattern mapping mechanism translates a Gremlin query to a graph query pattern, then a graph view is obtained by persisting all the subgraph-isomorphic embeddings in a data graph g with respect to the given query. A filtering-and-verification framework may be used to check if the given query can be answered by the constructed view. In an embodiment, the database management system 200 may utilize the materialized view to evaluate the cost and benefit of a contained query. The evaluation of the view benefit may be computed based on both the view and the relational graph database.

Optionally, given a query workload, a set of candidate views and a memory space budget, a Gremlin and Gremlin2SQL optimizer may be used for obtaining the benefit value and view size for each view. The benefit may define the cost savings by using candidate views to answer the queries. The view size measures the memory space occupied by the view. A knapsack-style dynamic programming approach may be implemented by the database management system 200 according to an embodiment for producing the candidate view recommendation, i.e., the subset of candidate views 203a-n under a given memory space budget.

Optionally, given a query workload, a set of candidate views 203a-n and a memory space budget, a graph genetic algorithm is implemented by the database management system 200 according to an embodiment for exploring the containment relationships and common parts among the candidate graph views 203a-n. On the basis thereof, a smaller subset of views may be produced. According to an embodiment, in a two-phase framework, each graph pattern is broken down to a set of small subgraph fragments, then common fragments are merged, and the rest of the fragments are combined. Finally, a greedy approach may be implemented by the database management system 200 according to an embodiment to recommend the view selection, i.e., to select the subset of candidate graph views 203a-n.

In an embodiment, the database management system 200 implements an incremental view maintenance procedure in the case of updates of data and workloads. For the data update, the in-memory views may be updated accordingly, while the materialized views may be recomputed from the base table for the sake of update efficiency if the number of updates reaches the update threshold. Regarding the workload update, in an embodiment, a graph-gene indexing may be used to determine if the new workload is contained by the previous graph or genes. If it does, the benefit associated with the involved views is updated. Otherwise, a greedy selection algorithm may be called to select a new candidate view set. The newly selected views that are not in the previously selected views may be cached and the outdated views may be evicted if the memory space is not sufficient.

In the following, a detailed description of different embodiments of the database management system 200 is provided. A first section of the following description provides a high-level architectural description of how candidate graph views 203a-n are selected for a given workload by the database management system 200 according to an embodiment. Further sections of the following description provide details about candidate view selection, query mapping and candidate view recommendation and view maintenance, as implemented by different embodiments of the database management system 200.

1. System Overview

As illustrated in FIG. 2b, the cornerstone of the database management system 200 is an abstraction layer 201 implemented by the processor 200a that sits on top of an RDBMS 210, accepts a set of graph queries, in particular gremlin queries, and constructs one or more graph views in the memory 200b that can then be utilized to speed up future graph queries. A first component in the abstraction layer 201 is an automatic view manager 206, which may be implemented by the processor 200a and may be responsible for three tasks. The first task is to extract the view data 207 from the underlying base tables 211. This is achieved by the translation between queries and views. The second task is to select the views into the memory 200b, which is based on one or more selection algorithms that will be described in more detail below. The third task is to incrementally maintain the view definition and data when data and workloads are changed.

A further component in addition to the view manager 206 is the in-memory graph views component 202, which caches the selected subset of candidate graph views that can be used to answer the queries using a graph query engine 205, for instance, the TinkerPop graph engine 205. In an embodiment, the view structure may adopt the structure of Tinkergraph that is an in-memory property graph implementation of TinkerPop. After mapping the query and view to a graph pattern, it may utilize a modified subgraph containment algorithm to determine if the query is contained by the views, as will be described in more detail in the following.

A further component in addition to the graph view component 202 is the SQL converter, e.g., a Gremlin2SQL converter 208 that translates the graph queries, e.g., Gremlin queries to SQL queries, then sends them to the relational query engine 210 for execution when the queries cannot be answered by the graph views. In an embodiment, such translation may be achieved by mapping the vertex set and the edge set of the graph to the relational tables 211 and converting a set of Gremlin pipelines to pre-defined SQL templates. As already described above, in the embodiment shown in FIG. 2b the relational-graph database comprises the SQL converter 208, the SQL query engine 210 as well as the relational database, i.e., relational tables 211.

Some of the above concepts will be illustrated on the basis of the following example of a graph query in a social network. For a given person p (id=4145), find p's two-hop friends. Such a query is useful for recommending new friends to the target person in the social network. Particularly, this query can be expressed using Gremlin as follow:

g.V( ).has('personid','4145').out("knows").out("knows")

Conventionally, this Gremlin query would be translated into a SQL query using Gremlin2SQL technique as follows:

WITH friends AS (SELECT * FROM customer c INNER JOIN knows k1 on c.id=k1.personid1 where c.id='4145')
WITH 2hopfriends AS (SELECT k2.personid2 as id from friends f JOIN knows k2 on f.personid2=k2.personid1")
SELECT 2f.name from 2hopfriends 2f JOIN customer c on c.id=2f.id;

From the above example, it can be seen that a simple gremlin traversal query will be translated to a SQL query with three inner joins, which can incur a significant overhead. As already described above and as will be described in more detail below, the database management system 200 allows selecting and maintaining a subset of "optimized" candidate graph views of the relational-graph database within the memory constraints of the database management system 200 and, thereby, improving the performance of graph queries in the relational-graph database.

Figure 3:
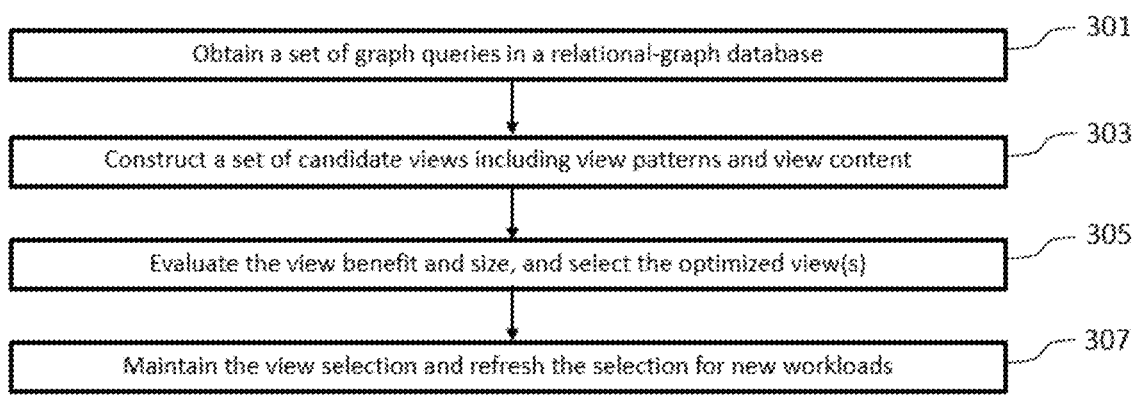
FIG. 3 is a flow diagram illustrating processing steps implemented by a database management system according to an embodiment.

FIG. 3 is a flow diagram illustrating processing stages or steps implemented by the database management system 200 for selecting and maintaining the subset of candidate graph views 203a-n according to an embodiment. In a first stage 301, a set of gremlin queries is obtained. In a further stage 303, a set of candidate graph views with view patterns and view content is generated, as will be described in more detail below. In a further stage 305, the view benefit and size according to a filtering-and-verification framework and finally the optimized view selection is determined, as will be described in more detail below. In a final stage 307, the candidate view selection is maintained and the selection is refreshed if new workloads come.

2. Query-Driven View Construction

In the following, the query-driven construction of candidate graph views 203a-n by the database management system 200 according to an embodiment will be described in more detail using the following definitions of data graph, gremlin pattern query, and gremlin graph view.

A data graph is a multi-relational, attributed, digraph G=(V, E, L, P), where:
(1) V is a set of vertices;
(2) E⊆V×V, in which (v, v') denotes an edge from vertex v to v';
(3) L is a label function such that for each vertex v∈V and edge e∈E, L(v) or L(e) is a label from an alphabet Σ;
(4) P is a function such that for each node v∈V and each edge e∈E, wherein P(v) or P(e) is a set of key/value pairs called properties. Intuitively, P specifies the attributes of a vertex, e.g., name, age, gender, or the attributes of an edge, e.g., a timestamp.

A gremlin pattern query is a digraph Qg=(Vp, Ep, L, f) over a data graph G, where:
(1) $V_p$ and $E_p$ are the set of pattern vertices and the set of ordered pattern edges, respectively;
(2) L is a label function such that for each vertex v∈$V_p$ and edge e∈$E_p$, wherein L(v) or L(e) is a label from an alphabet Σ;
(3) f is a Boolean predicate such that for each vertex v∈$V_p$ and edge e∈$E_p$, f(v) and f(e) hold true.

A graph view, denoted by V ($Q_g$), which originates from a gremlin pattern query $Q_g$, has the same definition as $Q_g$'s, along with the view content, denoted by $V_G(Q_g)$, which includes all the subgraph-embeddings that consists of edges and nodes for $Q_g$. Hence, $V_G(Q_g)$ can be used to answer $Q_g$ without access to the data graph g or other materialized data.

In an exemplary embodiment, the graph query may be a graph query in a social network, which finds the friends of a given person with id '001', and also return the friends' workplaces and studied schools. A corresponding gremlin graph query pattern may be expressed as follows:

g.V( ).match(
____.as('p').has('id','001').out('knows').as('f'),
____.as('f').out('workAt').as('c'),
____.as('f').out('studyAt').as('s'))
.select('p', 'f', 'c','s')

As will be appreciated, in this example, the gremlin graph query pattern is composed of two components: a data graph g and a match( ) step that declares a set of connected traversal patterns, where the first pattern is the starting edge with a Boolean function has('id','001') for the outbound vertex; the as( ) step labels the query nodes and the out( ) step defines the outgoing labelled edge for each traversal pattern.

A graph view, such as a gremlin graph view consists of two parts, namely the view pattern and the view content. As already described above, embodiments of the database management system 200 adopt a query-driven approach that generates the candidate views based on a workload, i.e., queries previously processed by the database management system 200. However, considering all materialized views of a workload is generally not viable, because this would explode the enumeration space of query cost evaluation. Thus, in an embodiment, the database management system 200 is configured to prune the candidate views. In an embodiment, the database management system 200 may be configured to prune the candidate views using three pruning stages or conditions. In an embodiment, the database management system 200 may be configured to employ one or more of the following three pruning stages or conditions.

The database management system 200 may be configured in a first pruning stage to determine for a respective candidate view 203a-n whether its cost has a small fraction of the total cost of the workload or its cost is lower than a small threshold, e.g., one second (the intuition being that inexpensive queries that can be well handled in the underlying relational engines should not be considered). The cost can be obtained from the history statistics, if available, or can be the optimizer-estimated cost by the underlying database.

In an alternative or additional pruning stage, the database management system 200 may determine whether the referenced table set of a candidate graph view 203a-n has a small size and occurs infrequently. This criterion is based on the observation that if one graph query involved an infrequent table subset, the query is unlikely to be reused in the future.

In an alternative or additional pruning stage, the database management system 200 may be configured to determine whether the number of rows it involves is larger than the upper bound of the memory resource budget. This means the maximum memory resource budget for accommodating the graph data cannot be compromised, therefore, such queries will not be considered either. One way to get the involved row size of the query is to invoke the relational optimizer for estimating the involved rows of the given query.

Given a set of gremlin graph queries, the database management system 200 is configured in an embodiment to derive the graph traversals parsed from the queries and to standardize them to gremlin pattern queries. In a further step, the database management system 200 is configured to map a gremlin pattern query to a graph query pattern by adding the traversal patterns step by step from the start vertex. Since in an embodiment the query nodes are labelled with given alias, the mapping procedure may also map the alias label to the node label in the schema graph. For instance, for the example described above, the first traversal pattern may be derived as p(id=001)→f and the following two patterns f→c, f→s may be added to the pattern graph. Finally, the labels p, f, c, s may be mapped to person, person, company, and school that are inferred from the schema graph.

In a further stage, the database management system 200 is configured to generate the view content. In an embodiment, the database management system 200 is configured to create an edge-induced graph as the view content by the following steps: (1) the edges are traversed from the starting edge in sequential order as the query's pattern; (2) for each visited pattern edge, all the matched results of edges in the data graph g with their end points are added to the view graph; and (3) the procedure terminates when all the patterns have been visited. Since the matched results of an edge depend on its previous traversals, the previous traversals may be cloned and the visited end points may be cached as the intermediate results as well as used for computing the matches of subsequent traversals.

3. Benefit-Based View Evaluation

In the following, v denotes a candidate view 203a-n for a given workload Q. In order to quantify the positive impact of caching the view v, the database management system 200 may be implemented to use the benefit b as a local performance indicator of a view v defined as follows. The benefit b of a view v is defined as the cost savings by processing the query using the view v compared to using the underlying relational storage, i.e., database R. Mathematically, this may be expressed by the following equation:

$$b(v, Q) = \sum_{q \in Q} (w_i \times (\text{cost}(q|R) - \text{cost}(q|v))) \quad (1)$$

where $w_i$ denotes the weight of the query $q_i$ in the workload Q and where cost(q|R) and cost(q|v) denote the cost of query evaluation over the relational-graph database and the view, respectively.

For computing the view benefit, i.e., the local performance indicator, in an embodiment the database management system 200 may be configured to use the PROFILE feature of a gremlin query to obtain the corresponding cost of query evaluation. In case of a negative or small value of the view total benefit, the database management system 200 may prune such views in the process of candidate view selection.

However, before evaluating the query cost by view, the database management system 200 may be configured to determine whether a query can be answered by a view. In an embodiment, the database management system 200 may be configured to implement a filtering-and-verification framework, which is described in more detail in the following, to achieve this goal.

In an embodiment, the filtering-and-verification framework implemented by the database management system 200 consists of two main stages described in more detail below. In a first stage, the database management system 200 is configured to check whether a query pattern is contained by a view pattern. If this is not the case, the respective queries will be filtered away, i.e., pruned and will not be evaluated on the checked views. In a second stage, the database management system 200 is further configured to verify if the view content contains all the matched results of the given query. In the following, these two stages of the filtering-and-verification framework implemented by the database management system 200 according to an embodiment will be described in more detail.

In an embodiment, the database management system 200 may be configured to verify whether a query pattern is contained by a view pattern on the basis of the following definition of pattern containment. The pattern of query $Q'_g$ is contained by the pattern of another query $Q_g$, denoted by $P(Q'_g) \subset P(Q_g)$, if and only if the following conditions hold:
1. there exists a subgraph isomorphism mapping M from $Q'_g$ to $Q_g$, such that $Q'_g$ is a subgraph embedding of $Q_g$;
2. for each query node $v' \in Q'_g$, the mapping node v=M(v') has the same label and the same Boolean predicates as v'; and
3. for each edge $e' \in Q'_g$, the mapping edge e=M(e') has the same label and the same Boolean predicates as e'.

Although finding all the subgraph isomorphism mappings is NP-Hard, several practical algorithms may be implemented to find the subgraph isomorphism in polynomial time. In an embodiment, the database management system 200 may be configured to implement the VF2 algorithm disclosed in L. P. Cordella, P. Foggia, C. Sansone, and M. Vento. A (sub) graph isomorphism algorithm for matching large graphs. IEEE transactions on pattern analysis and machine intelligence, 26(10):1367-1372, 2004 or a variant thereof that can run in quadratic time for checking a pattern containment between two queries. More specifically, in an embodiment, the database management system 200 may implement the VF2 algorithm to find a subgraph isomorphism for the above condition 1. If this is the case, the database management system 200 may then check whether above conditions 2 and 3 hold as well.

Given $P(Q_g) \subset P(Q'_g)$ and denoting $V_G(Q_g)$ as the view content for $Q_g$, the database management system 200 may be configured to determine that $Q'_g$ can be answered using $V_G(Q_g)$, denoted by $Q'_g \subset V_G(Q_g)$, by determining whether the following two conditions hold:

1. There exists a mapping M from each edge $e' \in E'_p$ to the edge pattern $e \in E_p$ where Ep is a set of edge patterns of $V_p(Q_g)$.
2. For the edge $e \in Q_g$ that has no mapping from $e' \in Q'_g$, if the end vertex $v_e$ in the edge e has the mapping from $v' \in Q'_g$, the node $v_e = M(v')$ must have occurred in prior traversal patterns of $Q_g$.

As already described above, the above conditions 1 and 2 may allow the database management system 200 to verify that the view content $V_G(Q_g)$ includes all the subgraph-embeddings for $Q'_g$ (despite the existence of a subgraph isomorphism between $Q'_g$ and $Q_g$). This is because the graph view $V_G(Q_g)$ is an edge-induced graph and it is constructed by the database management system 200 in the traversal order of the query $Q_g$. Therefore, it may traverse some edges that are not pattern edges of $Q'_g$, leading to the missing of the partial results of $Q'_g$. This may be further illustrated on the basis of the following simple example of a chain traversal. Given two pattern queries: Q1: a→b→c and Q2: a→b→c→d, it may be appreciated that the pattern of Q1 is contained by that of Q2. However, if the starting edge of Q2 is c→d that has no mapping from Q1, the view $V_G(Q2)$ cannot guarantee that all the matched vertices of query node c are included due to the constraint of query node d. In this case, the view $V_G(Q2)$ cannot be used to answer the graph query Q1. If, however, the starting edge of the graph query Q2 is not c→d, one may appreciate that c→d must be traversed after the pattern b→c. Thus, in this case the graph query Q1 can be answered using the view $V_G(Q2)$.

Using the definitions introduced above, FIG. 4 illustrates a first algorithm implemented by the database management system 200 for determining whether a graph query can be answered using a view. The algorithm illustrated in FIG. 4 takes a pattern query $Q_g$, a view $V(Q'_g)$, and a subgraph isomorphism M between query $Q_g$ and $Q'_g$ as input and proceeds with the following steps:

(1) verify whether the above condition 1 holds by checking if each edge of $Q'_g$ have the edge mapping in $M(E_p)$, wherein $E_p$ denotes a set of edge patterns of $V_p(Q_g)$;
(2) verify whether the above condition 2 holds by iteratively identifying the visited vertex mapping $M(V_p)$ in the edges of $Q'_g$ and adding the visited vertices to the dictionary, denoted by $D_v$; and
(3) terminate the process once a Boolean value has been returned.

If the dictionary $D_v$ includes all the vertices mapping from $M(V_p)$, the database management system 200 is configured to verify the graph query $Q_g$ to be answerable by the view $V_G(Q'g)$.

4. Automatic View Selection

In the following, embodiments of the view selection implemented by the database management system 200 are described in more detail. More specifically, in a first portion of the following description, the general view selection problem addressed by the database management system 200 will be explained in more detail. In a second and third sections of the following description further details of a Benefit-Driven Algorithm (BDA) (employing local performance indicators) and a Graph-Genetic Algorithm (GGA) (employing global performance indicators) implemented by embodiments of the database management system 200 for selecting a subset of the candidate views will be described in more detail.

The general view selection problem addressed by the database management system 200 may be formulated as follows. Given the set of candidate views V for a specific workload Q, and a quantity S (defining the available space of the memory 200b), the view-selection problem is to select a set of views $V_s$ derived from V that maximize the total benefit of $b(V_s, Q)$, under the constraint that the total memory space occupied by $V_s$ is less than S. The size of a view V or view size $s_v$ may be defined as the total number of edges and nodes of the view content of the respective view.

The view-selection problem is NP-hard even for the special case in which $V_s$ is a subset of V and each view in $V_s$ is independent, i.e., cannot be merged with the other views. For such a static case, the database management system 200 may implement a reduction of the knapsack problem, i.e., to find a set of k items having the space occupancy s1, ..., sk and the benefits b1, ..., bk, so as to maximize the sum of the benefits of the selected items that fill the memory space budget S. In an embodiment, the database management system 200 may be also configured to handle the dynamic case, wherein the views in $V_s$ can be changed, e.g., by adding, modifying, or removing a view. This embodiment is more complex to compute, because the space of the potential view sets is extremely large and in practice it is usually unfeasible to explore all possible combinations. In the following, the respective algorithm implemented by the database management system 200 for each setting will be described in more detail.

FIG. 5 illustrates a possible algorithm for graph view selection implemented by the database management system 200, referred to herein as Benefit-Driven Algorithm (BDA). The BDA considers the view-selection problem as a static case of a knapsack-style problem. It uses a dynamic programming strategy that implements the following stages: (i) obtain the size for each view v in the candidate view set V (for instance, in an embodiment, the size of the in-memory graph may be taken directly as the view size, since it already has been constructed); (ii) evaluate the benefit for each view v (i.e., the local performance indicator) in the candidate view set V by enumerating $S_V$, wherein By denotes the view benefit vector and $S_V$ denotes the size vector; and (iv) use a bottom-up approach, which is inverse to step (iii), to obtain the selected subset of candidate views.

This is further illustrated by the following example of three graph queries Q1, Q2, Q3 in a social network:

Q1: g.V( ).has('personid','001').as('p').out('knows').as('f').select('p','f')
Q2: g.V( ).has('personid','001').as('p').out('knows')
.as('f').out('isLocatedIn').as('c').select('p','f','c')
Q3: g.V( ).has('personid','001').as('p').match(
___.as('p').out('knows').as('f'),
___.as('f').out('workAt').as('c'),
___.as('f').out('studyAt').as('u'))
.select('p', 'f', 'c','u')

where Q1 is to find the friends of a given person (id='001'), Q2 is to find the friends and their locations of the same person, and Q3 is to return the person (id='001')'s friends' workplaces and graduated universities. By calling the VF2 algorithm with the verification framework, as implemented by the database management system 200 according to an embodiment, for checking the pattern containment, it will be determined that Q1 is contained by both Q2 and Q3. Thus, the candidate view set can be reduced to {Q2, Q3}.

In the following, the Graph-Genetic Algorithm (GGA) implemented by embodiments of the database management system 200 for selecting a subset of the candidate views will be described in more detail in the context of FIG. 6, which illustrates the GGA. As will be appreciated, the implementation of the GGA by the database management system 200 models the view selection procedure as a state search, wherein every state consists of a set of selected views, and a total benefit (i.e., a global performance indicator). The initial state corresponds to the original candidate view set V, having some benefit b(V). By adding, modifying, and removing the views from the initial state, the database management system 200 is configured to obtain another state $V_k$ from the view set V, which may have a larger benefit $b(V_k)$ and so on. In an embodiment, the database management system 200 is configured to dismiss the state $V_k$, if its benefit is not larger than the benefit of the original candidate view set V, and to continue applying other view transformations starting from the previously attained state. In an embodiment, the database management system 200 may be configured to cache all candidate views, if the available memory space allows doing so. In practice, however, the available memory space will often be limited. Thus, in an embodiment, the database management system 200 is configured to determine the subset of the plurality of candidate graph views of the relational-graph database based on the benefit associated with the respective set of views within the constraint defined by the total size of the memory 200b available for storing the subset of candidate graph views 203a-n.

For adding, modifying, and removing views from the initial state, the database management system 200 according to an embodiment is configured to implement two atomic probabilistic operations for transforming graph views, namely a fission operation and a fusion operation. In an embodiment, the fission operation is a transformation that splits a graph view into multiple sub-graph views, while the fusion operation is a transformation that merges and joins sub-graphs of multiple views. By means of the fission and the fusion operation, the database management system 200 is configured to identify and merge common sub-graph parts across views. Such transformations are most interesting since finding the common subgraphs for the graphs is an NP-hard problem. As an exhaustive search for the common subgraphs in graphs can be very expensive, especially for large workloads, the database management system 200 according to an embodiment is configured to implement a probabilistic optimization algorithm in order to make a trade-off between efficiency and optimality.

In an embodiment, the fission operation implemented by the database management system 200 leverages a vertex-cut approach based on the DFS (Depth First Search) to find the articulation points of a graph and then breaks a graph to multiple subgraphs according to its articulation points. These subgraphs may be referred to as genes of a graph. For instance, in the example described above the articulation point of Q2 is the node f that can break the Q2 into two genes: p(id='001')→f and f→c. In the DFS approach, a vertex u is an articulation point if one of the following two conditions holds: (i) the vertex u is a root of a DFS tree and it has at least two children; (ii) the vertex u is not the root and it has a child v such that no vertex in the subtrees rooted with v has a back edge to one of the ancestors of u.

In an embodiment, the fusion operation implemented by the database management system 200 merges and joins the views by the following steps.
(i) Call the VF2 algorithm with the verification method to check the subgraph containment between a graph gene with the other graphs. If it is contained, proceed with step (ii), otherwise proceed with step (iii).
(ii) Check if the rest of the genes have commonality with the genes of other graphs. If they do, merge them to the graph. Otherwise, join them to the gene of the same graph.
(iii) Assemble the remaining genes to a graph.

As will be appreciated, different from the BDA that only considers the single view case (associated with a local performance indicator), the GGA involves a kind of multi-view answering (associated with a global performance indicator), wherein the graph genes have been divided and joined to different graph views. In an embodiment, the database management system 200 is configured to implement a greedy approach that operates as follows.
(1) For each query q in the workload Q, check if it can be answered by a single view. If this is the case, evaluate the benefit and go to step (3). Otherwise, check if it can be contained by multiple views that have genes that can comprise a supergraph of the query q. If this is the case, go to step (2). Otherwise, go to step (3).
(2) Evaluate the total benefit of the view set V by the following equation:

$$b(V, q) = \text{cost}(q|R) - \left(\sum_{v \in V} \text{cost}(q|v) + \text{cost}(v_1 \bowtie \ldots \bowtie v_n)\right) \quad (2)$$

where the cost consists of the sum of their partial evaluation cost $\Sigma v \in V \text{ cost}(q|v)$ and the combination cost($v_1 \bowtie \ldots \bowtie vn$); cost(q|R) denotes the query cost over the relational-graph database.

After the total benefit b(V,q) has been evaluated, the benefit is assigned to each $v \in V$ in proportion to its partial evaluation cost, i.e., cost(q|v).
(3) Repeat this procedure until all queries have been answered.
(4) Iteratively select the view with the maximum benefit until the total size exceeds the memory size constraint S.

5. Index-Based View Maintenance

In an embodiment, the database management system 200 is configured to support view maintenance in the case of data updates and workloads updates. In an embodiment, this is achieved by a two-level graph-gene indexing (herein referred to as GG-index). FIG. 7 illustrates a plurality of two-level graph-gene indices 203a1-ai, 203 b1-bj and 203N1-Nk for the plurality of candidate graph views 203a-n. Advantageously, the GG-index is a by-product of the GGA described above and, therefore, does not have to be generated from scratch. Once the subset of the candidate graph views has been determined by the GGA, the GG-index is automatically generated and may be cached in the memory 200b of the database management system 200 to allow maintaining the views. As will be described in more detail below and as shown in FIG. 7, the GG-index may comprise two integers or levels and the database management system 200 may be configured to use the first integer (or level) of the GG-index for identifying a graph view 203a-n and the second integer (or level) of the GG-index for identifying the contained graph genes.

For handling view-data updates and ensuring the consistency of the view data and the underlying base data, the database management system 200 may be configured to update the base data and then synchronize the updates to the view data. Updating the data of the selected subset of candidate views is usually straightforward as the data are stored in the memory 200b of the database management system 200. Hence, these can be updated directly. However, updating the data of materialized views needs special handling as overwhelming updates would incur significant costs due to random disk I/O operations. To address this issue, the database management system 200 according to an embodiment implements a lazy-update strategy that postpones the updates for a fixed period of time and, if the number of updates reach the size of the view size, the materialized view will be recomputed from the underlying base data.

In the case of workload updates, the database management system 200 may be configured to use the GG-index for determining whether the new workload is contained by the selected views or genes. If this is the case, i.e., the new workload is contained by the selected views or genes, the database management system 200 may be configured to just update the benefit of involving views and genes. Otherwise, the benefit for the new workload will be calculated and the final step of the greedy selection will be called again to select a new view set. The selected views that are not in the new view set will be replaced by those in the new view set. More specifically, given a new query q, the verification process implemented by the database management system 200 may comprise the following stages.

(1) For each view v in the first level of the GG-index, check if it is a case such that $q \subset v$ using Algorithm 1. If this is the case, then update the view benefit accordingly. Otherwise go to (2).
(2) Iteratively check for each gene $g \subset q$. If this is the case, add the gene to the matched set M(g) and perform a fusion operation to the remaining items in the set.
(3) Check if there is a case such that $\exists g \in M(g), (g=q) \vee (q \subset g)$. If this is the case, update the benefit of view set accordingly as the new query can be answered by the genes. Otherwise go to (4).
(4) The algorithm 3 will be called to produce a new generation and a new selection. The newly selected views that are not in the previously selected views will be cached and the outdated views will be evicted if the memory space is not sufficient.

6. Performance

The performance of embodiments of the database management system 200 has been tested using the following setup. The database management system 200 has been implemented on a machine with a 4-core i5-4590 CPU and 16 GB RAM. Tinkerpop v3.3.0 has been chosen as the graph computing engine. The in-memory graph views are implemented as TinkerGraph structures, while views are materialized as graphml files. The underlying SQL engine is SQLG v2.0.2 that supports the Gremlin2SQL feature.

A LDBC graph dataset with a scale factor SF1 was created, resulting in a graph having roughly 1 million vertices and 2 million edges. The exemplary workload consists of nine gremlin pattern queries Q1-Q9 in total.

Figure 8:
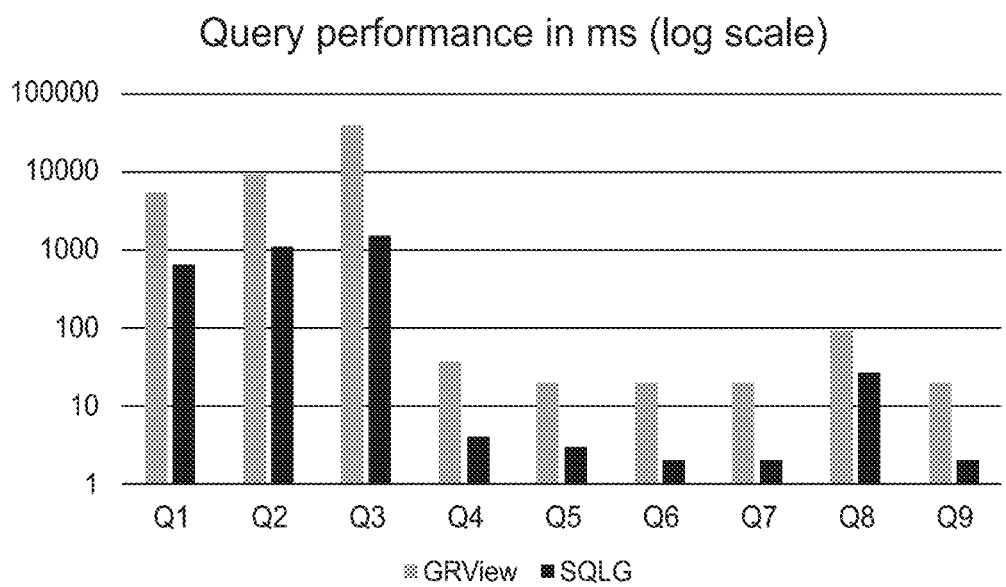
FIG. 8 compares the query performance for a number of queries between a database management system according to an embodiment and a relational database management system.

FIG. 8 compares the performance of the database management system 200 according to an embodiment (referred to as "GRView") for all queries Q1-Q9 in comparison with the SQL engine SQLG (for every query the bar on the left hand side shows the performance of the database management system 200 according to an embodiment, while the bar on the right shows the SQLG performance). The results clearly show that the approach implemented by the database management system 200 according to an embodiment can significantly speed up the answering of graph queries compared to the relational approach, i.e., SQLG. The reason for the speeding up to up to a factor of 16 is two-fold. Firstly, the increase in the number of edges traversed directly corresponds to the query cost, since the view method has the relatively smaller size of the graph, thus it avoids the unnecessary graph traversal than the others (for instance, for two views v1 and v2, which can both answer a query q, the view v1 due to its smaller size than the view v2 will answer the query q faster, because its query processing has to handle less data). Secondly, because the database management system 200 according to an embodiment leverages the in-memory graph views with a native graph execution engine to perform the input graph queries, it can speed up the execution of complicated graph queries for the relational store by avoiding the costly joins.

Figure 9A:
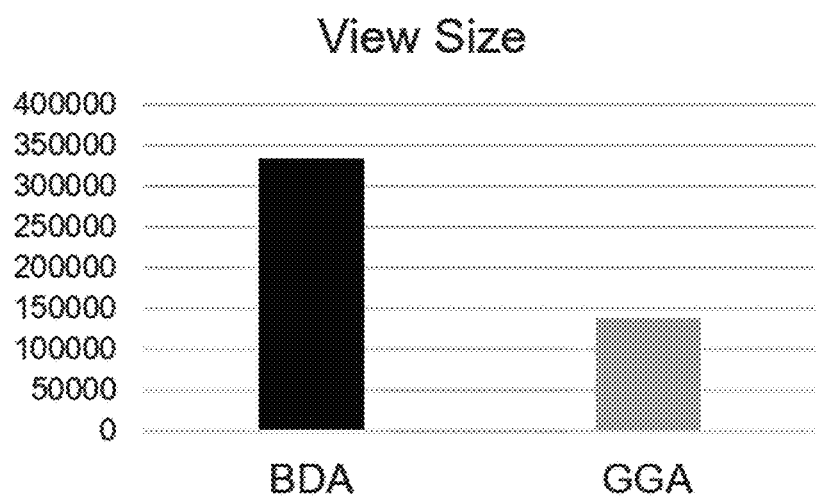
FIGS. 9a and 9b compare the view size and the running time between two algorithms implemented by a database management system according to different embodiments.
Figure 9B:
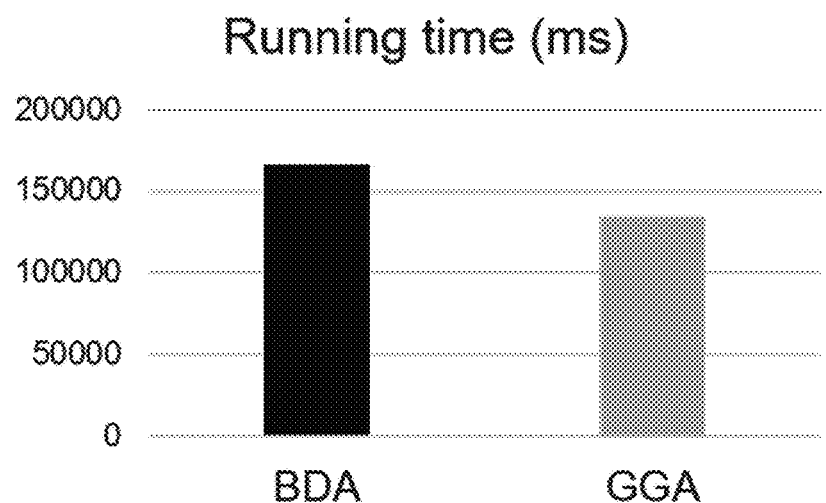

FIGS. 9a and 9b show a comparison between the performance of embodiments of the database management system 200 implementing the BDA and the GGA, respectively. More specifically, FIG. 9a compares the view size used by embodiments of the database management system 200 implementing the BDA and the GGA, while FIG. 9b compares the running time for answering the queries. The first observation is that the embodiment of the database management system 200 implementing the GGA reduces the space of the view size up to 58% in comparison with the embodiment of the database management system 200 implementing the BDA, which illustrates the effectiveness of the GGA in identifying the common parts of graph views. The second observation is that, overall, GGA is faster than BDA in answering the queries. The reason is that GGA has a relatively smaller view set than that of BDA, thus it has the less time for view construction and query evaluation.

Figure 10:
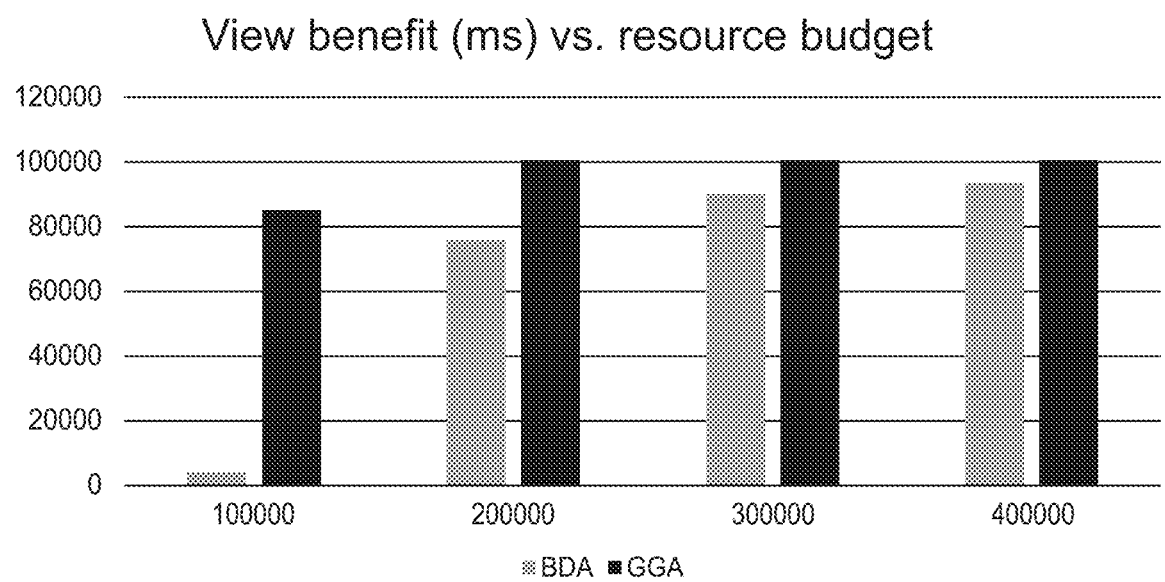
FIG. 10 compares the view benefit and the resource budget between the two algorithms implemented by a database management system according to different embodiments.

FIG. 10 shows a comparison between the performance of embodiments of the database management system 200 implementing the BDA and the GGA in optimizing the overall view benefit. More specifically, the memory space budget is adjusted from 100000 to 400000 (in steps of 100000) for comparing the view benefit gained by the two different embodiments. As can be taken from FIG. 10, the results show that GGA converges faster than BDA and has higher benefits. When the space budget reaches 200000, as shown in the FIG. 9a, the view size of GGA is less than 150000 so that all the views in GGA can be cached in memory resulting in a better performance in answering the queries. On the other hand, as the space budget is further increased to 400000, the BDA can have the constant benefit, i.e., all the views in the BDA can be cached for a space budget of 400000. Nevertheless, GGA has always a larger view benefit than BDA, which confirms that GGA can provide a better view selection via view state transformation.

Although several embodiments of the database management system 200 have been described above within the Gremlin framework, it will be appreciated that embodiments of the database management system 200 may be used for accelerating other types of graph queries, such as Cypher queries in a relational-graph database. Cypher queries also use a MATCH syntax to declare a graph pattern matching. Generally, the embodiments of the database management system 200 described above may be implemented using the Cypher framework or its variants as well. This may simply require a modification of the query parsing for identifying the ordered patterns as well as the generation of the graph views. In terms of view selection, the view benefit computed by the database management system 200 of the embodiments described above may be computed differently. For instance, a possible variant of the embodiments of the database management system 200 described above is a cost model approach that can incorporate other factors of views such as the maintenance cost.

Embodiments of the database management system 200 may be implemented in other applications for more complicated graph analytics such as OLAP (online analytical processing) for graph analysis. Although embodiments described above focus on the graph pattern matching, embodiments may be extended to support more complex Gremlin graph query steps like control (repeat, branch . . . ) or algorithmic (e.g., shortest path, pagerank). The main challenge is how to check the query containment of views in such cases. Moreover, although in the above the case has been considered that the views can completely answer the queries, embodiments of the database management system 200 may be used as well for answering the queries partially. In other words, embodiments of the database management system 200 may be capable of answering more queries combined with the underlying base tables.

Figure 11:
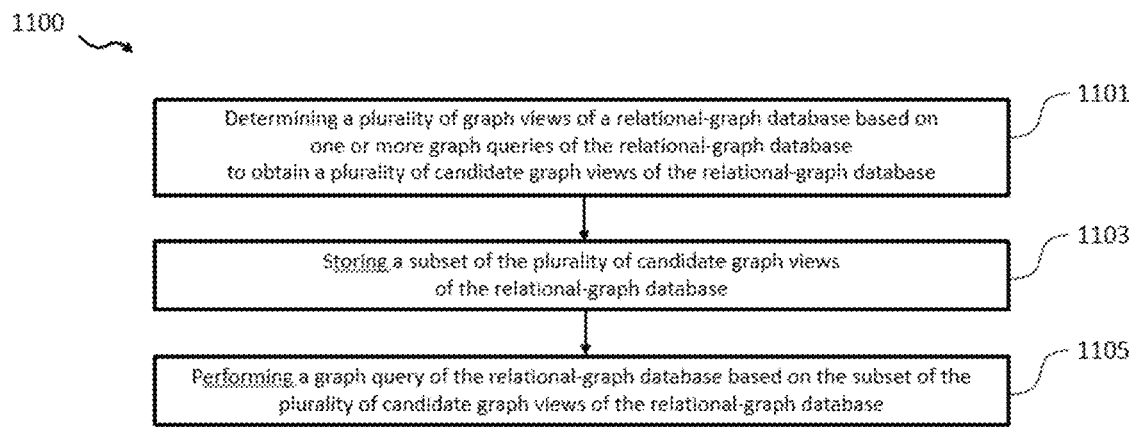
FIG. 11 is a flow diagram illustrating a database management method according to an embodiment.

FIG. 11 is a diagram illustrating a method 1100 for performing a graph query based on one or more graph views 203a-n of the relational-graph database. The method 1100 comprises a step 1101 of determining a plurality of graph views 203a-n of the relational-graph database based on one or more graph queries of the relational-graph database to obtain a plurality of candidate graph views 203a-n of the relational-graph database. Moreover, the method 1100 comprises a step 1103 of storing a subset of the plurality of candidate graph views 203a-n of the relational-graph database, for instance, in the memory 200b. The method 1100 comprises a further step 1105 of performing a graph query of the relational-graph database based on the subset of the plurality of candidate graph views of the relational-graph database.

The person skilled in the art will understand that the "blocks" ("units") of the various figures (method and apparatus) represent or describe functionalities of embodiments of the present disclosure (rather than necessarily individual "units" in hardware or software) and thus describe equally functions or features of apparatus embodiments as well as method embodiments (unit=step).

In the several embodiments provided in the present application, it should be understood that the disclosed system, apparatus, and method may be implemented in other manners. For example, the described embodiment of an apparatus is merely exemplary. For example, the unit division is merely logical function division and may be another division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the invention may be integrated into one processing unit, or each of the units may exist alone physically, or two or more units are integrated into one unit.

The invention claimed is:

1. A database management system for performing a graph query based on one or more graph views of a relational-graph database, comprising:
at least one processor and a memory storing instructions that, when executed by the at least one processor, cause the database management system to:
determine a plurality of graph views of the relational-graph database based on one or more graph queries of the relational-graph database to obtain a plurality of candidate graph views of the relational-graph database;
store a subset of the plurality of candidate graph views of the relational-graph database in the memory; and
perform a graph query of the relational-graph database based on the subset of the plurality of candidate graph views of the relational-graph database,
wherein the database management system further comprises a graph query engine and a relational query engine, wherein each query engine is executed by the at least one processor, and
wherein the instructions, when executed by the at least one processor, further cause the database management system to determine a respective performance indicator for each of the plurality of candidate graph views by comparing one or more queries processed by the graph query engine, using the respective candidate graph view with the same one or more queries processed by the relational query engine.

2. The database management system of claim 1, wherein each of the plurality of candidate graph views occupies a respective portion of the memory, and
wherein the instructions, when executed by the at least one processor, further cause the database management system to determine the subset of the plurality of candidate graph views of the relational-graph database based on a total size of the memory available for storing the determined subset of the plurality of candidate graph views of the relational-graph database and/or one or more performance indicators associated with the plurality of candidate graph views.

3. The database management system of claim 1, wherein the instructions, when executed by the at least one processor, further cause the database management system to translate the one or more graph queries for the graph query engine into one or more relational queries for the relational query engine, when the one or more graph queries are not processable by the graph query engine.

4. The database management system of claim 1, wherein the instructions, when executed by the at least one processor, further cause the database management system to determine the subset of the plurality of candidate graph views of the relational-graph database based on the one or more performance indicators of the plurality of candidate graph views and the total size of the memory available for storing the determined subset of the plurality of candidate graph views of the relational-graph database.

5. The database management system of claim 1, wherein the instructions, when executed by the at least one processor, further cause the database management system to determine whether the one or more graph queries are processable by the graph query engine using the respective candidate graph view.

6. The database management system of claim 2, wherein the one or more performance indicators associated with the plurality of candidate graph views comprise a plurality of global performance indicators, wherein each of the plurality of global performance indicators is associated with a respective combination of the plurality of candidate graph views, and wherein the instructions, when executed by the at least one processor, further cause the database management system to determine the subset of the plurality of candidate graph views of the relational-graph database based on the plurality of global performance indicators.

7. The database management system of claim 6, wherein the instructions, when executed by the at least one processor, further cause the database management system to determine the global performance indicator for a respective combination of the plurality of candidate graph views by splitting a respective candidate graph view into at least two candidate sub-graph views.

8. The database management system of claim 6, wherein the instructions, when executed by the at least one processor, further cause the database management system to determine the global performance indicator for a respective combination of the plurality of candidate graph views by merging sub-graphs of at least two of the plurality of candidate graph views to generate a Previously Presented candidate graph view.

9. The database management system of claim 1, wherein each of the plurality of the candidate graph views comprises a candidate graph view pattern and a candidate graph view content, and wherein the instructions, when executed by the at least one processor, further cause the database management system to determine the plurality of candidate graph views based on the one or more graph queries by mapping the one or more graph queries to one or more candidate graph view patterns.

10. The database management system of claim 9, wherein the instructions, when executed by the at least one processor, further cause the database management system to map the one or more graph queries to the one or more candidate graph view patterns by sequentially mapping nodes and edges of the one or more graph queries to nodes and edges of the one or more candidate graph view patterns.

11. The database management system of claim 9, wherein the instructions, when executed by the at least one processor, further cause the database management system to generate, based on the one or more graph queries, a respective edge-induced graph for generating the respective candidate graph view content of the respective candidate graph view.

12. The database management system of claim 1, wherein the instructions, when executed by the at least one processor, further cause the database management system to determine a cost measure value for each of the plurality of candidate graph views and to limit the number of candidate graph views by removing the candidate graph views having a cost measure value larger than a cost measure threshold value.

13. The database management system of claim 1, wherein the instructions, when executed by the at least one processor, further cause the database management system to receive one or more further graph queries and to adjust the subset of the plurality of candidate graph views of the relational-graph database in the memory based on the one or more further graph queries of the relational-graph database.

14. A method for performing a graph query based on one or more graph views of a relational-graph database, the method comprising:
　determining a plurality of graph views of the relational-graph database based on one or more graph queries of the relational-graph database to obtain a plurality of candidate graph views of the relational-graph database;
　storing a subset of the plurality of candidate graph views of the relational-graph database; and
　performing a graph query of the relational-graph database based on the subset of the plurality of candidate graph views of the relational-graph database,
　wherein the method further comprises determining a respective performance indicator for each of the plurality of candidate graph views by comparing one or more queries processed by a graph query engine, executed by at least one processor, using the respective candidate graph view with the same one or more queries processed by a relational query engine, executed by the at least one processor.

15. The method of claim 14, wherein each of the plurality of candidate graph views occupies a respective portion of a memory of a database management system, and
　the method further comprises determining the subset of the plurality of candidate graph views of the relational-graph database based on a total size of the memory available for storing the determined subset of the plurality of candidate graph views of the relational-graph database and/or one or more performance indicators associated with the plurality of candidate graph views.

* * * * *